US012447763B2

(12) United States Patent
Lee et al.

(10) Patent No.: US 12,447,763 B2
(45) Date of Patent: Oct. 21, 2025

(54) APPARATUS FOR INSPECTING INKJET HEAD NOZZLE

(71) Applicant: UNIJET CO., LTD., Gyeonggi-do (KR)

(72) Inventors: Sung Jin Lee, Seoul (KR); Jung Hun Park, Seoul (KR); Ho Maeng, Gyeonggi-do (KR); Se Hyun Sim, Incheon (KR)

(73) Assignee: UNIJET CO., LTD., Gyeonggi-Do (KR)

( * ) Notice: Subject to any disclaimer, the term of this patent is extended or adjusted under 35 U.S.C. 154(b) by 203 days.

(21) Appl. No.: 18/265,471

(22) PCT Filed: Sep. 2, 2021

(86) PCT No.: PCT/KR2021/011850
§ 371 (c)(1),
(2) Date: Jun. 6, 2023

(87) PCT Pub. No.: WO2022/158675
PCT Pub. Date: Jul. 28, 2022

(65) Prior Publication Data

US 2024/0025192 A1 Jan. 25, 2024

(30) Foreign Application Priority Data

Jan. 19, 2021 (KR) ........................ 10-2021-0007189

(51) Int. Cl.
*B41J 29/393* (2006.01)
*B41J 2/165* (2006.01)

(52) U.S. Cl.
CPC ......... *B41J 29/393* (2013.01); *B41J 2/16579* (2013.01); *B41J 2203/01* (2020.08)

(58) Field of Classification Search
CPC ..... B41J 29/393; B41J 2/16579; B41J 2/2142
See application file for complete search history.

(56) References Cited

U.S. PATENT DOCUMENTS

| | | | |
|---|---|---|---|
| 2018/0146162 | A1 | 5/2018 | Hauf et al. |
| 2019/0235803 | A1 | 8/2019 | Wong et al. |
| 2020/0376830 | A1 | 12/2020 | Kollata et al. |

FOREIGN PATENT DOCUMENTS

| | | |
|---|---|---|
| JP | 2007-111914 A | 5/2007 |
| JP | 2016-192407 A | 11/2016 |

(Continued)

OTHER PUBLICATIONS

International Search Report for PCT/KR2021/011850 mailed on Dec. 7, 2021.

(Continued)

*Primary Examiner* — Sharon Polk

(74) *Attorney, Agent, or Firm* — The PL Law Group, PLLC

(57) ABSTRACT

An apparatus for inspecting an inkjet head nozzle is capable of rapidly inspecting a jetting state of ink droplets sprayed from a head nozzle of inkjet equipment provided in a glove box. The apparatus for inspecting the inkjet head nozzle according to an embodiment includes a cartridge fastening portion which is installed in the glove box having the built-in inkjet equipment, and a cartridge portion which is provided with a testbed for the inspection of the jetting state of ink droplets from the head nozzle of the inkjet equipment, which has an inspection film supply roll and an inspection film recovery roll that are installed therein and replaceable so as to supply an inspection film onto the upper portion of the testbed, and which is attachable to/detachable from the cartridge fastening portion.

27 Claims, 9 Drawing Sheets

(56) References Cited

FOREIGN PATENT DOCUMENTS

| | | | |
|---|---|---|---|
| JP | 2019-059166 | A | 4/2019 |
| KR | 10-2007-0070506 | A | 7/2007 |
| KR | 10-2016-0083420 | A | 7/2016 |

OTHER PUBLICATIONS

Office action issued on Aug. 31, 2022 from Korean Patent Office in a counterpart Korean Patent Application No. 10-2021-0007189 (all the cited references are listed in this IDS.) (English translation is also submitted herewith.).

Notice of Allowance issued on Feb. 16, 2023 from Korean Patent Office in a counterpart Korean Patent Application No. 10-2021-0007189 (all the cited references are listed in this IDS.) (English translation is also submitted herewith.).

Office action issued on Jun. 25, 2024 from Japan Intellectual Property Office in a counterpart Japanese Patent Application No. 2023540044 (all the cited references are listed in this IDS.) (English translation is also submitted herewith.).

APPARATUS FOR INSPECTING INKJET HEAD NOZZLE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/011850, filed Sep. 2, 2021, which claims priority to the benefit of Korean Patent Application No. 10-2021-0007189 filed in the Korean Intellectual Property Office on Jan. 19, 2021, the entire contents of which are incorporated herein by reference.

BACKGROUND

1. Technical Field

The present invention relates to an apparatus for inspecting an inkjet head nozzle, and more particularly, to an apparatus for inspecting an inkjet head nozzle, which is capable of rapidly and easily replacing an inspection film for inspecting an ejection state of ink droplets sprayed from a head nozzle of inkjet equipment provided in a glove box.

2. Background Art

In recent years, as an inkjet technology develops, the inkjet technology is used in various fields such as the field of a display or a semiconductor.

For example, the inkjet technology is used in a process of printing ink in an extremely small area or performing precision coating such as LCD, color filter, OLED RGB, and OLED thin film encapsulation (TFE). For the color filter or OLED RGB, an exact amount of ink droplets is dropped exactly into a bank having tens or several micrometers to express each color. In this case, a physical error is required to be less than 1%.

As described above, a state in which ink droplets ejected from a head nozzle of inkjet equipment are ejected in an exact direction is necessarily maintained to perform a precise process using the inkjet technology.

Thus, an ejection state of the ink droplets of the head nozzle is periodically inspected to prevent problems such as the ink droplets ejected from the head nozzle being ejected in an oblique direction instead of an exact direction or not being ejected, and when the problems occur, maintenance in which other nozzles are used for correction instead of using poor nozzles is required.

As a method for periodically inspecting the ejection state of the ink droplets of the head nozzle, there is a method for observing an ejection state and a speed of the ink droplets by using a vision device at the time of ejection of the ink droplets to determine whether the ejection state of the head nozzle is normal.

However, the above-described method has a disadvantage in that a long time is required because each of the ink droplets ejected from many nozzles needs to be photographed and determined. In order to compensate for the disadvantage, a new technology is being developed.

As a technology for quickly inspecting the ejection state of ink droplets ejected from many nozzles of the inkjet head, there is 'apparatus and method for treating substrate, and discharge rate measuring unit' disclosed in Korean Patent Publication No. 10-2016-0083420'.

However, in the 'apparatus and method for treating substrate, and discharge rate measuring unit' as described above, since the substrate treating apparatus is installed in a glove box sealed with a specific gas atmosphere, and the discharge rate measuring unit is also installed in the glove box, there is an extremely inconvenient problem in that an operation of replacing a supply roller and a recovery roller with a new supply roller and a new recovery roller is performed within the glove box.

Thus, a technology capable of quickly replacing the supply roller and the recovery roller and quickly inspecting the ejection state of the ink droplets is required.

SUMMARY

The present invention provides an apparatus for inspecting an inkjet head nozzle, which is capable of quickly and easily replacing an inspection film for inspecting an ejection state of ink droplets sprayed from a head nozzle of inkjet equipment provided in a glove box to shorten an inspection time in order to solve the problems of the related art.

In order to solve the above-described technical problem, an embodiment of the present invention provides an apparatus for inspecting an inkjet head nozzle, the apparatus including: a cartridge fastening portion including: a fixing base installed in a maintenance area in a glove box for maintaining a head nozzle of inkjet equipment; a housing having a rectangular box shape and fixed to an upper portion of one side of the fixing base; and a supply manifold mounted on an upper portion of the housing; and a cartridge portion including: a cover box which has a rectangular box shape having opened one side and in which a bottom surface is seated on a top surface of the fixing base and an opened portion is seated on the housing to allow the cover box to be fastened to the cartridge fastening portion; an outer plate fastened to the other side of the cover box by a plurality of connecting rods; a connection manifold fastened to an upper portion of the cover box and an upper portion of the outer plate; a testbed assembled to an upper portion of the connection manifold; and a unwinding roller to which a replaceable inspection film supply roll is mounted and a winding roller to which a replaceable inspection film recovery roll is mounted, which are parallel to each other between the cover box and the outer plate.

Preferably, the supply manifold may include: at least one positive pressure supply hole connected to a positive pressure port configured to receive positive pressure; and at least one negative pressure supply hole connected to a negative pressure port configured to receive negative pressure, and the connection manifold may include: at least one positive pressure connection hole connected to the positive pressure supply hole to receive the positive pressure of the positive pressure supply hole; a positive pressure discharge hole that provides the positive pressure of the positive pressure connection hole to the testbed; at least one negative pressure connection hole connected to the negative pressure supply hole to receive the negative pressure of the negative pressure supply hole; and a negative pressure discharge hole that provides the negative pressure of the negative pressure connection hole to the testbed.

Preferably, the housing may contain a rotation driving part and a driving gear rotating by rotational force of the rotation driving part and exposed to the outside of the housing, and the winding roller may be exposed to the opened portion of the cover box and shaft-coupled with a driven gear engaged with the driving gear.

Preferably, the cartridge portion may include a driven friction roller provided between the cover box and the outer plate in parallel with the unwinding roller and shaft-coupled with a transmission gear exposed to the opened portion of the cover box, and the cartridge fastening portion may include a measurement gear engaged with the transmission gear, a rotation disk that is shaft-coupled with the measurement gear, and a photo sensor configured to detect an amount of rotation of the rotation disk.

Preferably, a guide rail may be formed on a top surface of the fixing base, and a guider guided by the guide rail may be disposed on a bottom surface of each of the outer plate and the cover box.

Preferably, a guide projection configured to guide a mounting position of the cartridge portion to the cartridge fastening portion and a guide bushing to which the guide projection is inserted may be disposed on facing surfaces of the housing and the cover box, respectively.

Preferably, the unwinding roller may be frictionally supported by a friction unit including a pulley shaft-coupled with the unwinding roller and exposed to the opened portion of the cover box, a friction wire wound around the pulley to generate predetermined friction force, and a fixing bracket configured to fix both ends of the friction wire.

Preferably, the unwinding roller may include a first unwinding roller rotatably supported on the cover box and a second unwinding roller rotatably supported on the outer plate, and the winding roller may include a first winding roller rotatably supported on the cover box and a second winding roller rotatably supported on the outer plate.

Preferably, the plurality of connecting rods may be separable from the cover box and the outer plate, and the outer plate may be separated from the cover box when the plurality of connecting rods are separated from the cover box and the outer plate.

Preferably, an anti-rotation projection by which a portion of the inspection film roll is caught and which is inserted thereto to prevent relative rotation of the inspection film supply roll or the inspection film recovery roll may be formed on each of the unwinding roller and the winding roller.

Preferably, a circular flange configured to prevent the inspection film supply roll or the inspection film recovery roll from being separated may be integrally formed on each of both ends of each of the unwinding roller and the winding roller.

Preferably, a support bracket may be disposed on each of both sides of the connection manifold, and a film support bar having a rounded upper portion may be disposed on the support bracket to maintain a horizontal state of the inspection film.

Preferably, fastening units that are coupled to each other to fix a mounting state of the cartridge portion to the cartridge fastening portion may be disposed on the housing and the cover box, respectively.

In an apparatus for inspecting an inkjet head nozzle in order to solve the above-described technical problem, an apparatus for inspecting an inkjet head nozzle includes: a cartridge fastening portion installed in a glove box having a built-in inkjet equipment; and a cartridge portion which includes a testbed for inspection of an ejection state of ink droplets of a head nozzle of the inkjet equipment, to which an inspection film supply roll and an inspection film recovery roll, which are replaceable to supply an inspection film onto an upper portion of the testbed, are mounted, and which is attachable to/detachable from the cartridge fastening portion.

Preferably, the cartridge fastening portion may be installed on a maintenance area in the glove box configured to maintain the head nozzle of the inkjet equipment.

Preferably, the cartridge fastening portion may include: at least one positive pressure supply hole connected to a positive pressure port configured to receive positive pressure; and at least one negative pressure supply hole connected to a negative pressure port configured to receive negative pressure, and positive pressure of the positive pressure supply hole and negative pressure of the negative pressure supply hole may be supplied to the cartridge portion.

Preferably, the cartridge fastening portion may include a rotation driving part and a driving gear that rotates by rotational force of the rotation driving part, and rotational force of the driving gear may be supplied to the cartridge portion.

Preferably, the cartridge fastening portion may include: a measurement gear configured to rotate by receiving rotational force of a driven friction roller disposed on the cartridge portion so as to rotate by friction with an inspection film unwound from the inspection film supply roll; a rotation disk connected to the measurement gear to rotate; and a photo sensor configured to detect an amount of rotation of the rotation disk, and an unwound amount of the inspection film unwound from the inspection film supply roll may be calculated based on an amount of rotation of the rotation disk detected by the photo sensor.

Preferably, the cartridge fastening portion may include at least one mounting guide configured to guide a mounting position of the cartridge portion.

Preferably, the cartridge portion may include: at least one positive pressure connection hole configured to receive positive pressure from the cartridge fastening portion; and at least one negative pressure connection hole configured to receive negative pressure from the cartridge fastening portion, and the positive pressure supplied to the positive pressure connection hole from the cartridge fastening portion and the negative pressure supplied to the negative pressure connection hole from the cartridge fastening portion may be supplied onto an upper portion of the testbed.

Preferably, the cartridge portion may include: an unwinding roller to which the inspection film supply roll is mounted; and a winding roller to which an inspection film recovery roll configured to wind the inspection film of the inspection film supply roll mounted to the unwinding roller is mounted. Here, the winding roller may rotate by receiving rotational force from the cartridge fastening portion, and the unwinding roller may be frictionally supported by a friction unit.

Preferably, the inspection film may be transferred so that an inspection surface of the inspection film unwound from the inspection film supply roll mounted to the unwinding roller faces an opposite side of the testbed and then wound around the inspection film recovery roll mounted to the winding roller.

Preferably, the cartridge portion may include a driven friction roller configured to rotate by friction with the inspection film unwound from the inspection film supply roll, and rotational force of the driven friction roller may be supplied to the cartridge fastening portion.

Preferably, the cartridge fastening portion may include: at least one positive pressure supply hole connected to a positive pressure port configured to receive positive pressure; and at least one negative pressure supply hole connected to a negative pressure port configured to receive negative pressure, and the cartridge portion may include: at least one positive pressure connection hole connected to the positive pressure supply hole to receive the positive pressure of the positive pressure supply hole; and at least one negative pressure connection hole connected to the negative pressure supply hole to receive the negative pressure of the negative pressure supply hole. Here, the positive pressure supplied to the positive pressure connection hole and the negative pressure supplied to the negative pressure connection hole may be supplied onto an upper portion of the testbed to allow the inspection film to float.

Preferably, the cartridge fastening portion may include a rotation driving part and a driving gear configured to rotate by rotational force of the rotation driving part, and the cartridge portion may include: an unwinding roller to which the inspection film supply roll is mounted; and a winding roller to which the inspection film recovery roll configured to wind the inspection film of the inspection film supply roll mounted to the unwinding roller is mounted. Here, the unwinding roller may be frictionally supported by a friction unit, the winding roller may be shaft-coupled with a driven gear, and rotational force of the driving gear may be transmitted to the driven gear to allow the unwinding roller to rotate.

Preferably, the cartridge portion may include a driven friction roller configured to rotate by friction with the inspection film unwound from the inspection film supply roll, and a transmission gear is shaft-coupled with the driven friction roller, and the cartridge fastening portion may include a measurement gear configured to rotate by receiving rotational force of the transmission gear, a rotation disk connected with the measurement gear to rotate, and a photo sensor configured to detect an amount of rotation of the rotation disk. Here, an unwound amount of the inspection film unwound from the inspection film supply roll may be calculated based on an amount of rotation of the rotation disk detected by the photo sensor.

In an apparatus for inspecting an inkjet head nozzle in order to solve the above-described technical problem, a porous ink droplet seated layer may be provided on a surface of the inspection film.

As described above, the present invention has the advantage of quickly and easily replacing the inspection film for inspecting the ejection state of the ink droplets sprayed from the head nozzle of the inkjet equipment provided in the glove box to shorten the inspection time.

The object of the present invention is not limited to the aforesaid, but other objects not described herein will be clearly understood by those skilled in the art from descriptions below.

DETAILED DESCRIPTION

The present invention may be carried out in various embodiments without departing from the technical ideas or primary features. Therefore, the above-described embodiments are merely illustrative of the present invention, but should not be limitedly interpreted.

It will be understood that although the terms such as 'first' and 'second' are used herein to describe various elements, these elements should not be limited by these terms.

The terms are only used to distinguish one component from other components. For example, a first element referred to as a first element in one embodiment can be referred to as a second element in another embodiment without departing from the scope of the appended claims.

As used herein, the term and/or includes any and all combinations of one or more of the associated listed items.

It will also be understood that when an element is referred to as being "connected to" or "engaged with" another element, it can be directly connected to the other element, or intervening elements may also be present.

It will also be understood that when an element is referred to as being 'directly connected to' another element, there is no intervening elements.

In the following description, the technical terms are used only for explaining a specific exemplary embodiment while not limiting the present invention. The terms of a singular form may include plural forms unless referred to the contrary.

The meaning of 'include' or 'comprise' specifies a property, a number, a step, a process, an element, a component, or a combination thereof in the specification but does not exclude other properties, numbers, steps, processes, elements, components, or combinations thereof.

Unless terms used in the present disclosure are defined differently, the terms may be construed as meaning known to those skilled in the art.

Terms such as terms that are generally used and have been in dictionaries should be construed as having meanings matched with contextual meanings in the art. In this description, unless defined clearly, terms are not ideally, excessively construed as formal meanings.

Hereinafter, embodiments disclosed in this specification is described with reference to the accompanying drawings, and the same or corresponding components are given with the same drawing number regardless of reference number, and their duplicated description will be omitted.

Moreover, detailed descriptions related to well-known functions or configurations will be ruled out in order not to unnecessarily obscure subject matters of the present invention.

Figure 1:
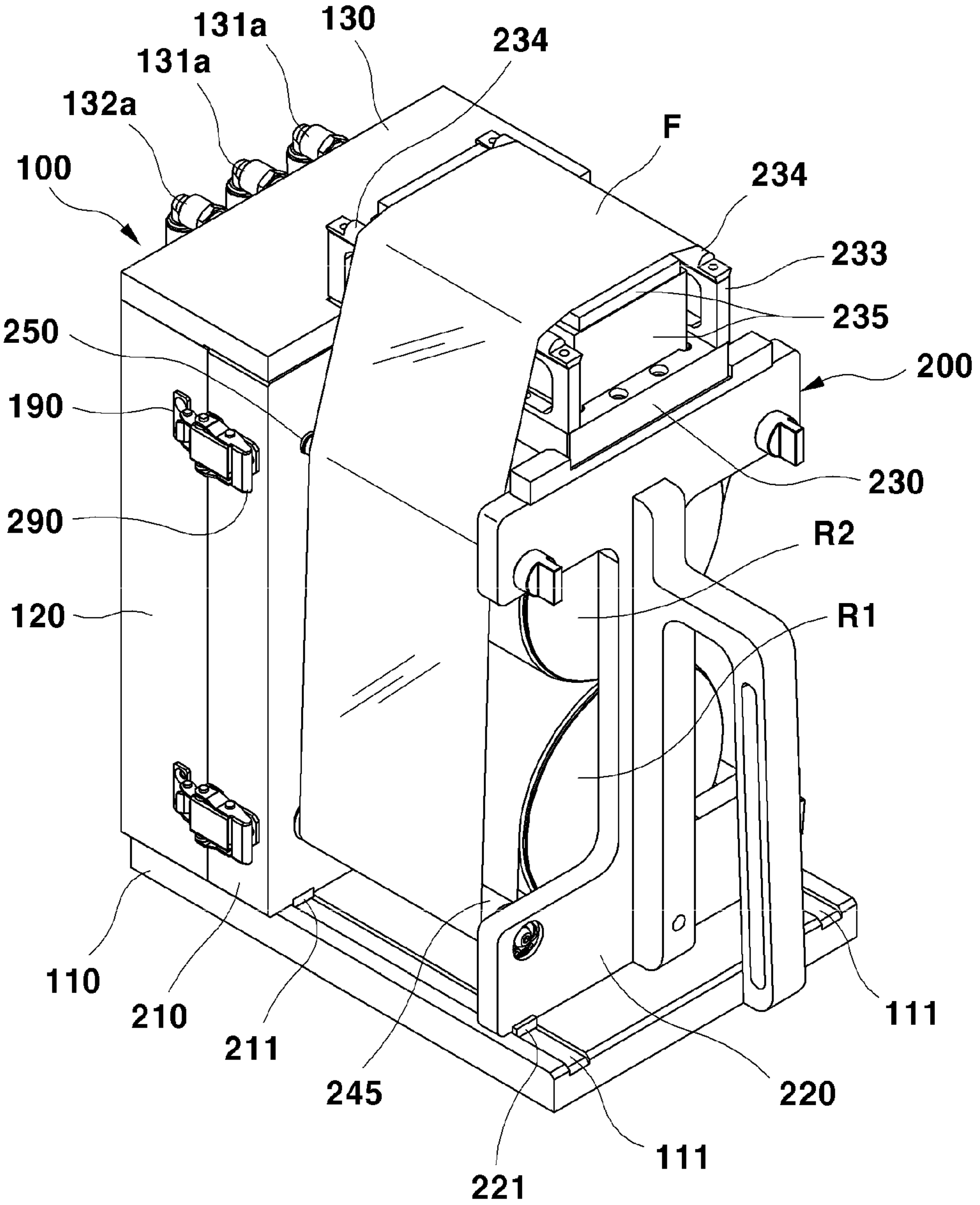
FIG. 1 is a perspective view illustrating an apparatus for inspecting an inkjet head nozzle in one direction according to an embodiment of the present invention.
Figure 2:
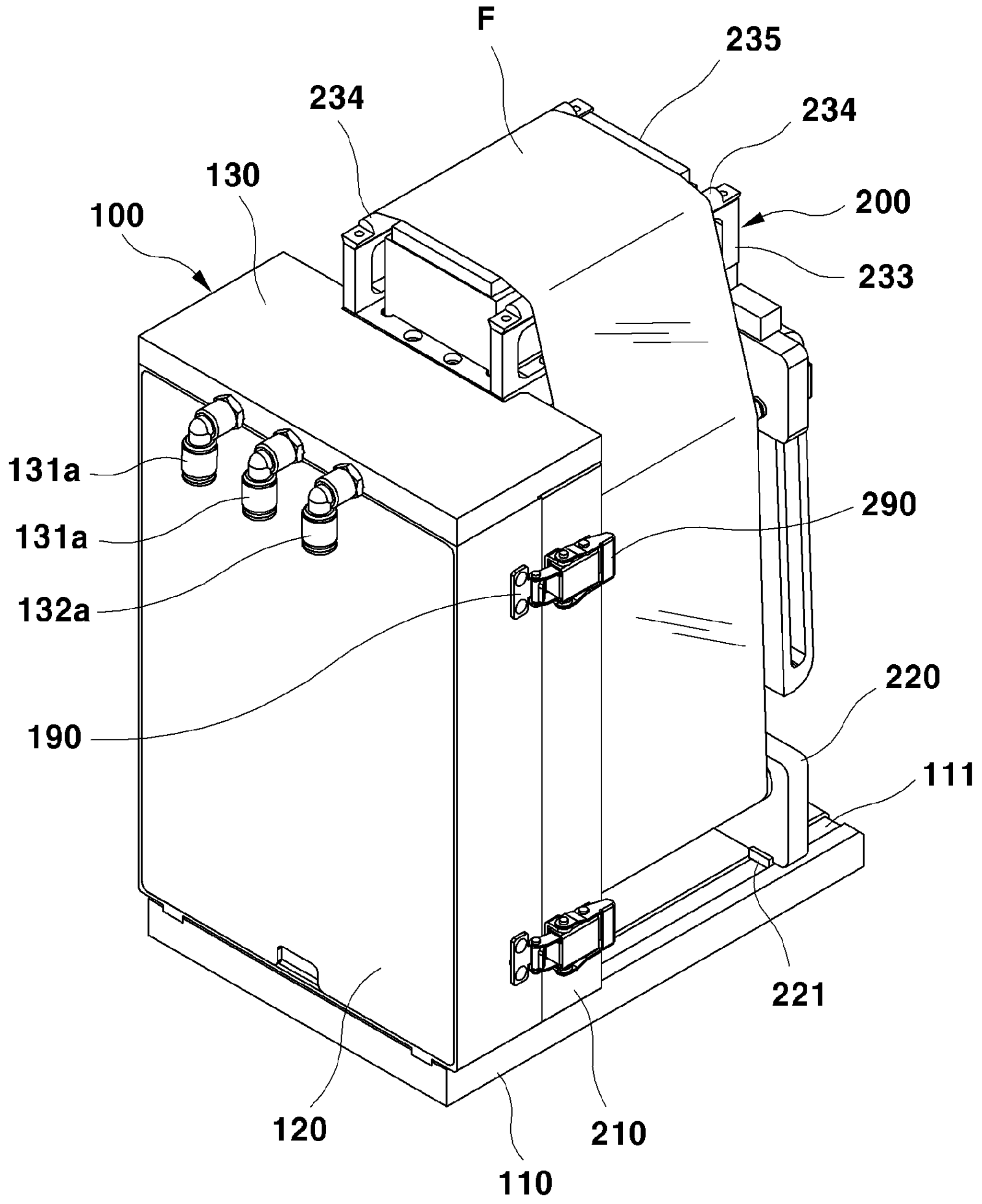
FIG. 2 is a perspective view illustrating the apparatus for inspecting the inkjet head nozzle in the other direction according to an embodiment of the present invention.
Figure 3:
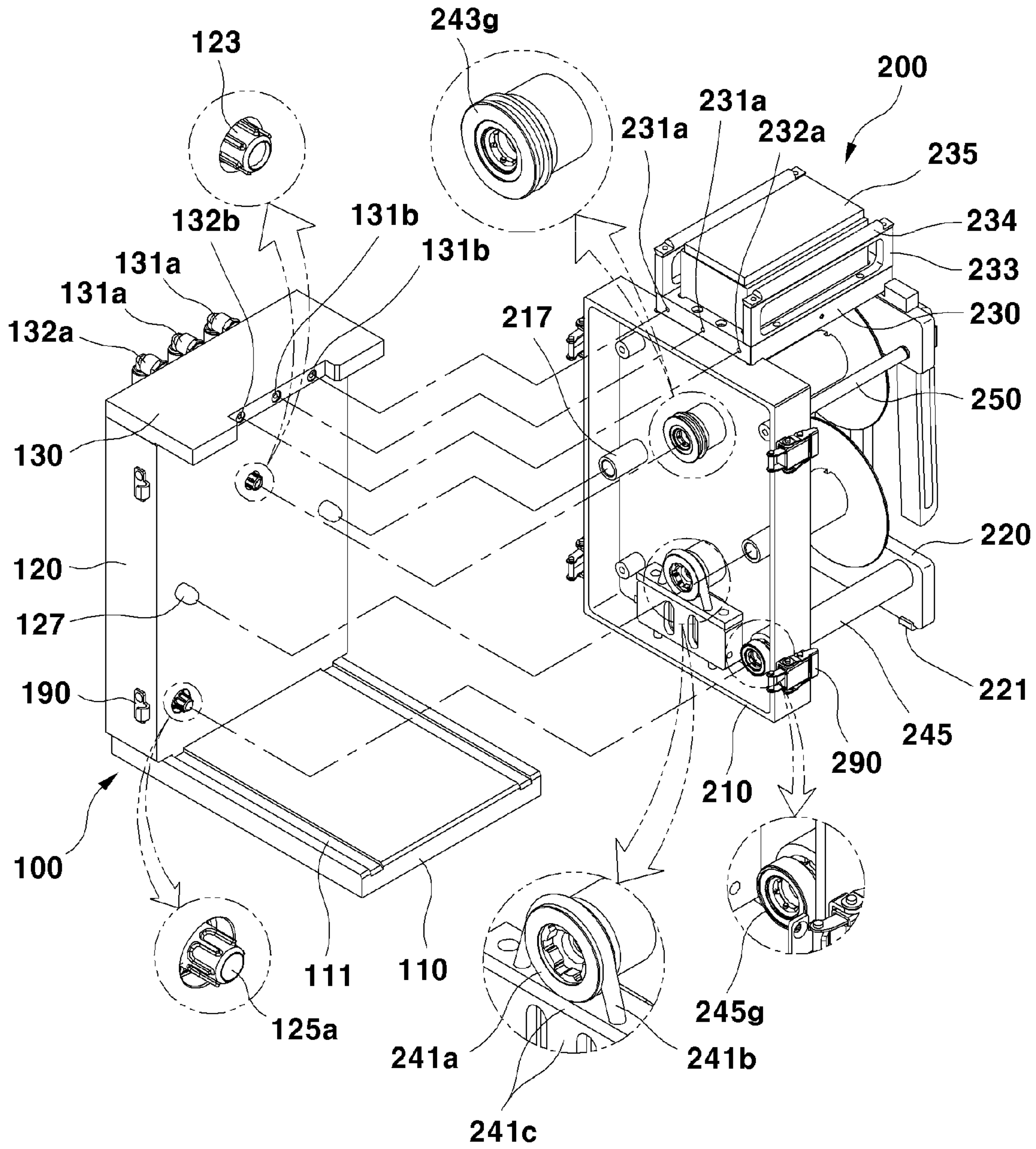
FIG. 3 is an exploded perspective view illustrating the apparatus for inspecting the inkjet head nozzle according to an embodiment of the present invention.

As illustrated in FIGS. 1 to 3, an apparatus for inspecting an inkjet head nozzle includes a cartridge a cartridge fastening portion 100 and a cartridge portion 200.

First, the cartridge fastening portion 100 will be described in detail.

The cartridge fastening portion 100 is installed in a glove box having built-in inkjet equipment, and the cartridge portion 200 is attachable to/detachable from the cartridge fastening portion 100.

Specifically, the cartridge fastening portion 100 is installed in a maintenance area for maintaining the head nozzle of the inkjet equipment in the inner space of the glove box, that is, an area accessible by a worker using a glove.

As illustrated in FIGS. 1 to 4, the cartridge fastening portion 100 includes a fixing base 110, a housing 120, and a supply manifold 130.

The fixing base 110 that is a portion that allows the cartridge fastening part 100 to be installed in the glove box is installed in the maintenance area in the glove box for maintaining the head nozzle of the inkjet equipment.

Specifically, the fixing base 110 may be installed on a stage capable of moving in an X-axis or Y-axis direction on a plane on the maintenance area in the glove box.

A guide rail 111 for guiding mounting of the cartridge portion 200 is formed on a top surface of the fixing base 110, and the cartridge portion 200 includes a first guider 211 and a second guider 221, which are slidable along the guide rail 111. The cartridge portion 200 may be guided to a mounting position by the guide rail 111 when mounted.

Specifically, the first guider 211 may be disposed on a bottom surface of a cover box 210 of the cartridge portion 200, and the second guider 221 may be disposed on a bottom surface of an outer plate 220 of the cartridge portion 200.

The housing 120 that is a portion fixed to an upper portion of one side of the fixing base 110 may have a rectangular box shape.

Figure 4:
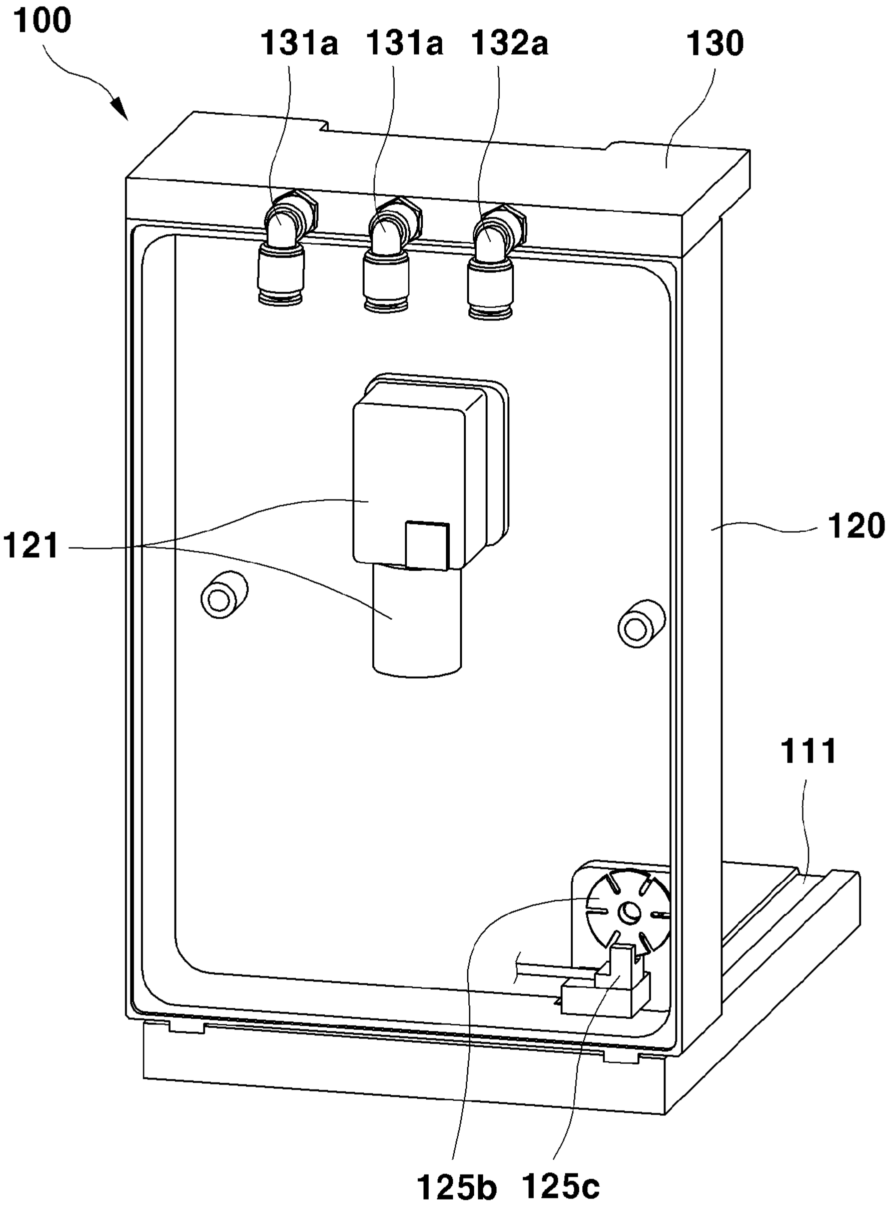
FIG. 4 is a perspective view illustrating the inside of a cartridge fastening portion of the apparatus for inspecting the inkjet head nozzle according to an embodiment of the present invention.

As illustrated in FIGS. 3 and 4, the housing 120 contains a rotation driving part 121 and a driving gear 123 rotating by rotational force of the rotation driving part 121 and exposed to the outside of the housing 120.

The rotation driving part 121 that is a unit for rotation driving of a motor, a reducer, and the like may receive power from a power supply device in the glove box to generate rotational force.

The driving gear 123 that is a portion shaft-coupled to a driving shaft of the rotation driving part 121 to rotate is exposed to the outside of the housing 120 in a direction in which the cartridge portion 200 is fastened.

When the cartridge fastening portion 100 and the cartridge portion 200 are fastened to each other, rotational force of the driving gear 123 rotationally driven by the rotation driving part 121 may be provided to the cartridge portion 200.

As illustrated in FIG. 4, the housing 120 contains a measurement gear 125*a* rotating by receiving rotational force of a driven friction roller 245 disposed on the cartridge portion 200, a rotation disk 125*b* connected to the measurement gear 125*a* to rotate, and a photo sensor 125*c* for detecting an amount of rotation of the rotation disk 125*b*.

For example, as the measurement gear 125*a* is shaft-coupled to one side of a rotation shaft rotatably supported by a rolling unit such as a bearing, and the rotation disk 125*b* is shaft-coupled to the other side of the rotation shaft, the rotation disk 125*b* may rotate integrally when the measurement gear 125*a* rotates.

The photo sensor 125*c* may detect the amount of rotation of the rotation disk 125*b* and calculate an amount of rotation of the driven friction roller 245 based on the detected amount of rotation of the rotation disk 125*b*.

The driven friction roller 245 that is a portion rotating by friction with an inspection film F unwound from an inspection film supply roll R1 may calculate an amount of rotation of the driven friction roller 245 to calculate an unwound amount of the inspection film F unwound from the inspection film supply roll R1.

A guide projection 127 may be disposed on a corresponding surface of the housing 120 on which the cartridge portion 200 is mounted, a guide bushing 217 may be disposed on a corresponding portion of the cartridge portion 200 corresponding to the guide projection 127, and a mounting position of the cartridge portion 200 to the cartridge fastening portion 100 may be guided by the guide projection 127 and the guide bushing 217.

Specifically, the guide bushing 217 may be disposed on a corresponding surface of the cover box 210 of the cartridge portion 200 facing the housing 120.

A first fastening unit 190 for fastening with the cover box 210 of the cartridge portion 200 may be disposed on a side portion of the housing 120, a second fastening unit 290 may be disposed on a corresponding portion of the cover box 210 corresponding to the first fastening unit 190, and a mounting state of the cartridge portion 200 to the cartridge fastening portion 100 may be fixed by the first fastening unit 190 and the second fastening unit 290.

The supply manifold 130 is mounted to an upper portion of the housing 120.

A positive pressure port 131*a* connected to a positive pressure supply device in the glove box to receive positive pressure and a negative pressure port 132*a* connected to a negative pressure supply device in the glove box to receive negative pressure are disposed at one side of the supply manifold 130.

A positive pressure supply hole 131*b* connected to the positive pressure port 131*a* to supply positive pressure and a negative pressure supply hole 132*b* connected to the negative pressure port 132*a* to supply negative pressure are disposed at the other side of the supply manifold 130.

Although the supply manifold 130 in this embodiment includes two positive pressure ports 131*a*, two positive pressure supply holes 131*b*, one negative pressure port 132*a*, and one negative pressure supply hole 132*b*, the number of each of the positive pressure port 131*a*, the negative pressure port 132*a*, the positive pressure supply hole 131*b*, and the negative pressure supply hole 132*b* may be variously changed.

When the cartridge fastening portion 100 and the cartridge portion 200 are fastened to each other, positive pressure of the positive pressure supply hole 131*b* and negative pressure of the negative pressure supply hole 132*b* may be provided to a connection manifold 230 of the cartridge portion 200.

Next, the cartridge portion 200 will be described in detail.

The cartridge portion 200 may include a testbed 235 for inspecting an ejection state of ink droplets of a head nozzle of inkjet equipment, and an inspection film supply roll R1 and an inspection film recovery roll R2 may be mounted to supply the inspection film to an upper portion of the testbed 235.

The cartridge portion 200 may be fastened to or separated from the cartridge fastening portion 100.

For example, the cartridge portion 200 may be provided to the maintenance area in the glove box through an antechamber configured to allow spaces to be connected to or separated from the glove box through an opening and closing door, and then a worker may simply mount the cartridge portion 200 to the cartridge fastening portion 100.

As illustrated in FIGS. 1 to 3, 5, and 6, the cartridge portion 200 includes a cover box 210, an outer plate 220, a connection manifold 230, a testbed 235, an unwinding roller 241, and a winding roller 243.

The cover box 210 has a rectangular box shape having opened one side. The cover box 210 is configured such that a bottom surface is seated on the top surface of the fixing base 110, and an opened portion is seated on the housing 120 to allow the cover box 210 to be fastened to the cartridge fastening portion 100.

The outer plate 220 may be fastened to the other side of the cover box 210 by a plurality of connecting rods 250 and have an approximate 'I' shape.

The plurality of connecting rods 250 connect or separate the cover box 210 and the outer plate 220 to or from each other. For example, one end of each connecting rod 250 may pass through a first hole h1 of the outer plate 220 and be fixed to a second hole h2 of the cover box 210, and a knob 250*n* disposed on the other end of each connecting rod 250 may be held by the first hole h1 of the outer plate 220.

Thus, as the knob 250*n* rotates in a state in which one end of the connecting rod 250 passes through the first hole h1 and then is positioned in the second hole h2, the connecting rod 250 fastens the cover box 210 and the outer plate 220 while maintaining a predetermined distance therebetween.

A well-known fastening structure such as a bolt and nut structure or a locking piece may be applied to one end of the connecting rod 250 and the second groove h2 for mutual fastening when the connecting rod 250 rotates.

The connection manifold 230 is fastened to an upper portion of the cover box 210 and an upper portion of the outer plate 220.

Figure 6:
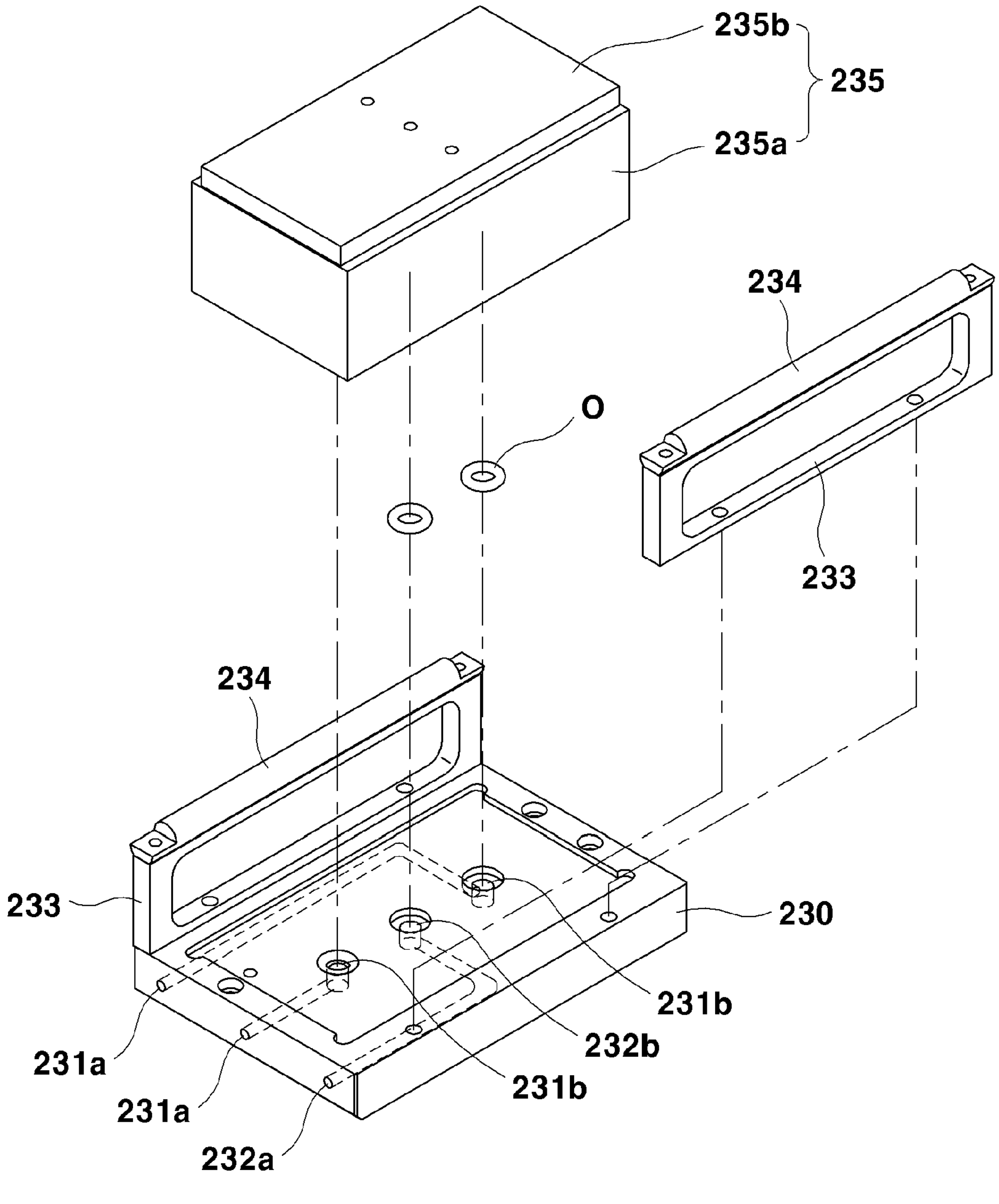
FIG. 6 is an exploded perspective view illustrating a testbed of the cartridge portion of the apparatus for inspecting the inkjet head nozzle according to an embodiment of the present invention.

As illustrated in FIG. 6, the connection manifold 230 having an approximately rectangular block shape may include: at least one positive pressure connection hole 231*a* connected to the positive pressure supply hole 131*b* to receive the positive pressure of the positive pressure supply hole 131*b* of the supply manifold 130; a positive pressure discharge hole 231*b* providing positive pressure of the positive pressure connection hole 231*a* to the testbed 235; at least one negative pressure connection hole 232*a* connected to the negative pressure supply hole 132*b* to receive the negative pressure of the negative pressure supply hole 132*b* of the supply manifold 130; and a negative pressure discharge hole 232*b* providing negative pressure of the negative pressure connection hole 232*a* to the testbed 235.

That is, when the cartridge fastening portion 100 and the cartridge portion 200 are fastened to each other, the supply manifold 130 of the cartridge fastening portion 100 and the connection manifold 230 of the cartridge portion 200 are connected to each other. Here, the positive pressure supply hole 131*b* and the positive pressure connection hole 231*a* are connected to each other, and the negative pressure supply hole 132*b* and the negative pressure connection hole 232*a* are connected to each other.

Also, an O-ring may be disposed between the positive pressure supply hole 131*b* and the positive pressure connection hole 231*a* and between the negative pressure supply hole 132*b* and the negative pressure connection hole 232*a*, and the O-ring may be disposed on one of the supply manifold 130 or the connection manifold 230.

Positive pressure supplied to the positive pressure connection hole 231*a* from the supply manifold 130 of the cartridge fastening portion 100 and negative pressure supplied to the negative pressure connection hole 232*a* are supplied to the testbed 235

The testbed 235 is assembled to an upper portion of the connection manifold 230.

As illustrated in FIG. 6, the testbed 235 may have a structure in which a lower block 235*a* and an upper block 235*b* are integrated with each other. The structure may be equal or similar to a well-known floating device that lifts a substrate with a predetermined gap by using positive pressure and negative pressure, and a detailed description thereof will be omitted.

The testbed 235 is connected to the positive pressure discharge hole 231*b* and the negative pressure discharge hole 232*b* of the connection manifold 230, and positive pressure and negative pressure act together on a top surface of the upper block of the testbed 235.

The O-ring may be disposed in the positive pressure discharge hole 231*b* and the negative pressure discharge hole 232*b* of the connection manifold 230.

A support bracket 233 is disposed on each of both sides of the connection manifold 230, and a film support bar 234 having a rounded upper portion is disposed on the support bracket 233 to maintain a horizontal state of the inspection film F.

Thus, the inspection film F may be supplied in a horizontal state to an upper portion of the test bed 235 by the film support bar 234, and the positive pressure and the negative pressure acting on the top surface of the testbed 235 allow the inspection film F to float a predetermined distance from the upper portion of the testbed 235.

The unwinding roller 241 and the winding roller 243 may be disposed in parallel to each other between the cover box 210 and the outer plate 220, and a replaceable inspection film roll may be mounted thereto. Specifically, the inspection film supply roll R1 may be mounted to the unwinding roller 241, and the inspection film recovery roll R2 may be mounted to the winding roller 243.

Figure 5:
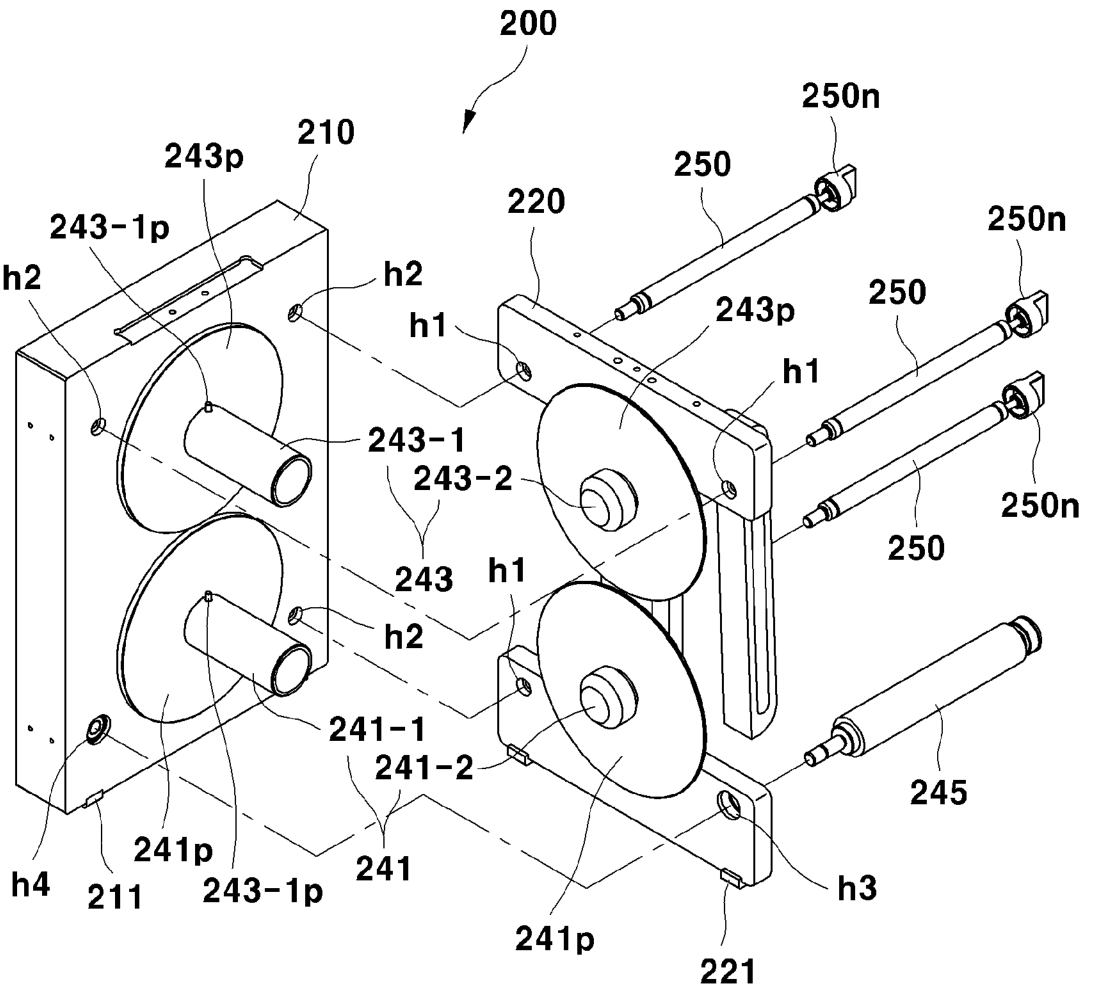
FIG. 5 is an exploded perspective view illustrating a partial configuration of a cartridge portion of the apparatus for inspecting the inkjet head nozzle according to an embodiment of the present invention.
Figure 7:
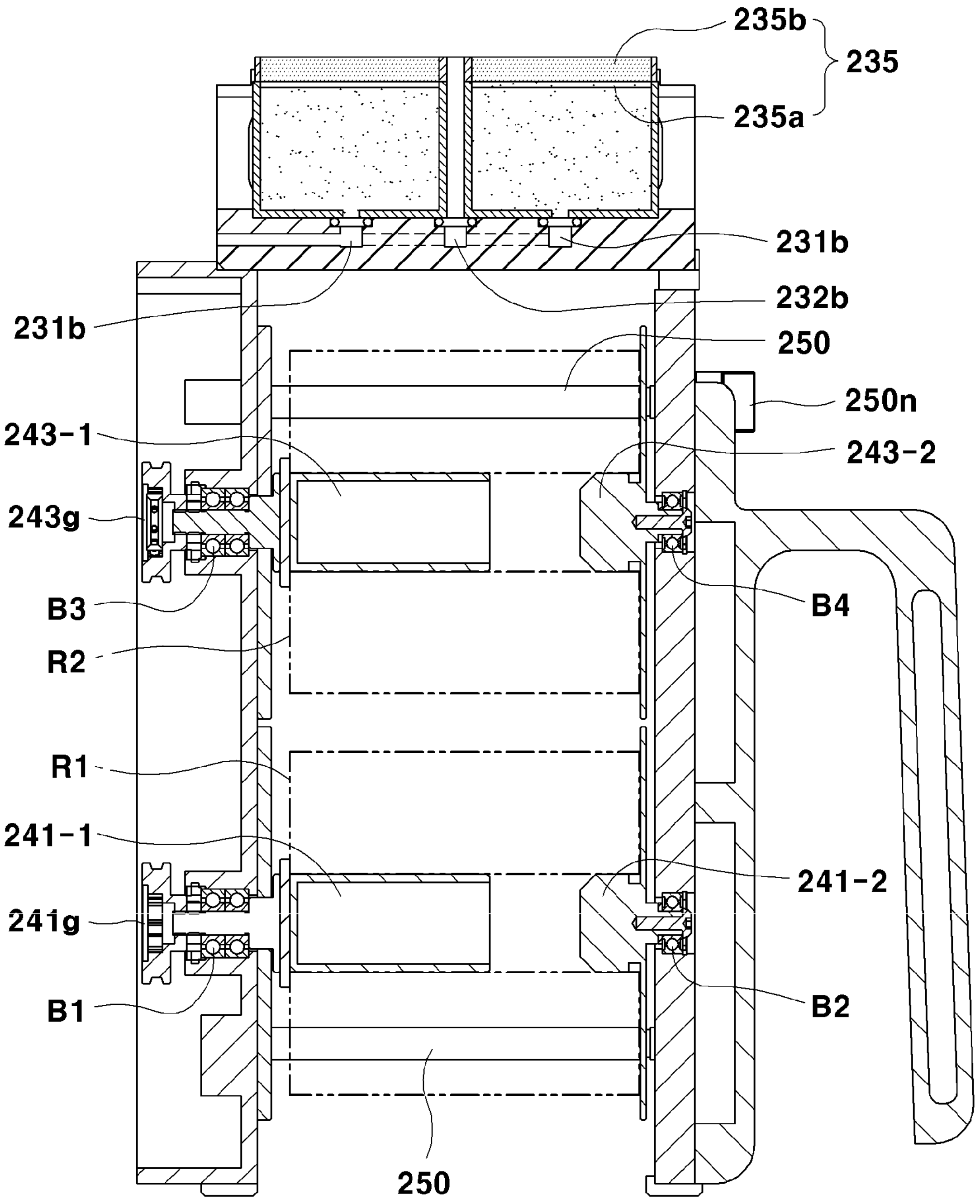
FIG. 7 is a cross-sectional view illustrating the apparatus for inspecting the inkjet head nozzle according to an embodiment of the present invention.

As illustrated in FIGS. 5 and 7, the unwinding roller 241 may be divided into a first unwinding body 241-1 rotatably supported by a first bearing B1 on the cover box 210 and a second unwinding body 241-2 rotatably supported by a second bearing B2 on the outer plate 220.

A first anti-rotation projection 241-1*p* by which a portion of the inspection film supply roll R1 is caught and which is inserted thereto may be formed on the first unwinding body 241-1 of the unwinding roller 241 to prevent relative rotation of the inspection film supply roll R1.

Also, a first circular flange 241*p* preventing the inspection film supply roll R1 from being separated may be integrally formed on each of both ends of the unwinding roller 241.

As illustrated in FIG. 3, the unwinding roller 241 is frictionally supported by a friction unit including a pulley 241*a* shaft-coupled with the unwinding roller 241 and exposed to the opened portion of the cover box 210, a friction wire 241*b* wound around the pulley 241*a* to generate predetermined friction force, and a fixing bracket 241*c* fixing both ends of the friction wire 241*b*.

As the unwinding roller 241 is frictionally supported by the friction unit, when the inspection film F wound around the inspection film supply roll R1 is unwound by the winding roller 243, predetermined tension is applied to the inspection film F by the friction unit.

As illustrated in FIGS. 5 and 7, the winding roller 243 may be divided into a first winding body 243-1 rotatably supported by a third bearing B3 on the cover box 210 and a second winding body 243-2 rotatably supported by a fourth bearing B4 on the outer plate 220.

A second anti-rotation projection 243-1*p* by which a portion of the inspection film recovery roll R2 is caught and which is inserted thereto may be formed on the first winding body 243-1 of the winding roller 243 to prevent relative rotation of the inspection film recovery roll R2.

Also, a second circular flange 243*p* preventing the inspection film recovery roll R2 from being separated may be integrally formed on each of both ends of the winding roller 243.

As illustrated in FIG. 3, the winding roller 243 is exposed to the opened portion of the cover box 210 and shaft-coupled with a driven gear 243*g* engaged with the driving gear 123.

The winding roller 243 rotates by receiving rotational force from the cartridge fastening portion 100, and specifically, rotational force of the driving gear 123 is transmitted to the driven gear 243*g* to allow the winding roller 243 to rotate.

The driven friction roller 245 is further provided between the cover box 210 and the outer plate 220 and disposed in parallel to the unwinding roller 241, and a transmission gear 245*g* exposed to the opened portion of the cover box 210 is shaft-coupled thereto.

Specifically, the driven friction roller 245 may be rotatably supported by bearings disposed in a third hole h3 and a fourth hole h4.

Thus, rotational force of the transmission gear 245*g* may be transmitted to the measurement gear 125*a*, the rotational force transmitted to the measurement gear 125*a* may allow the rotation disk 125*b* to rotate, and an amount of rotation of the rotation disk 125*b* may be detected by the photo sensor 125*c* to calculate an unwound amount of the inspection film F unwound from the inspection film supply roll R1.

Through the above-described configuration of the unwinding roller 241 and the winding roller 243, the inspection film F is transferred so that an inspection surface of the inspection film F unwound from the inspection film supply roll R1 mounted to the unwinding roller 241 faces upward in the testbed 235 and then wound around the inspection film recovery roll R2 mounted to the winding roller 243.

Figure 8:
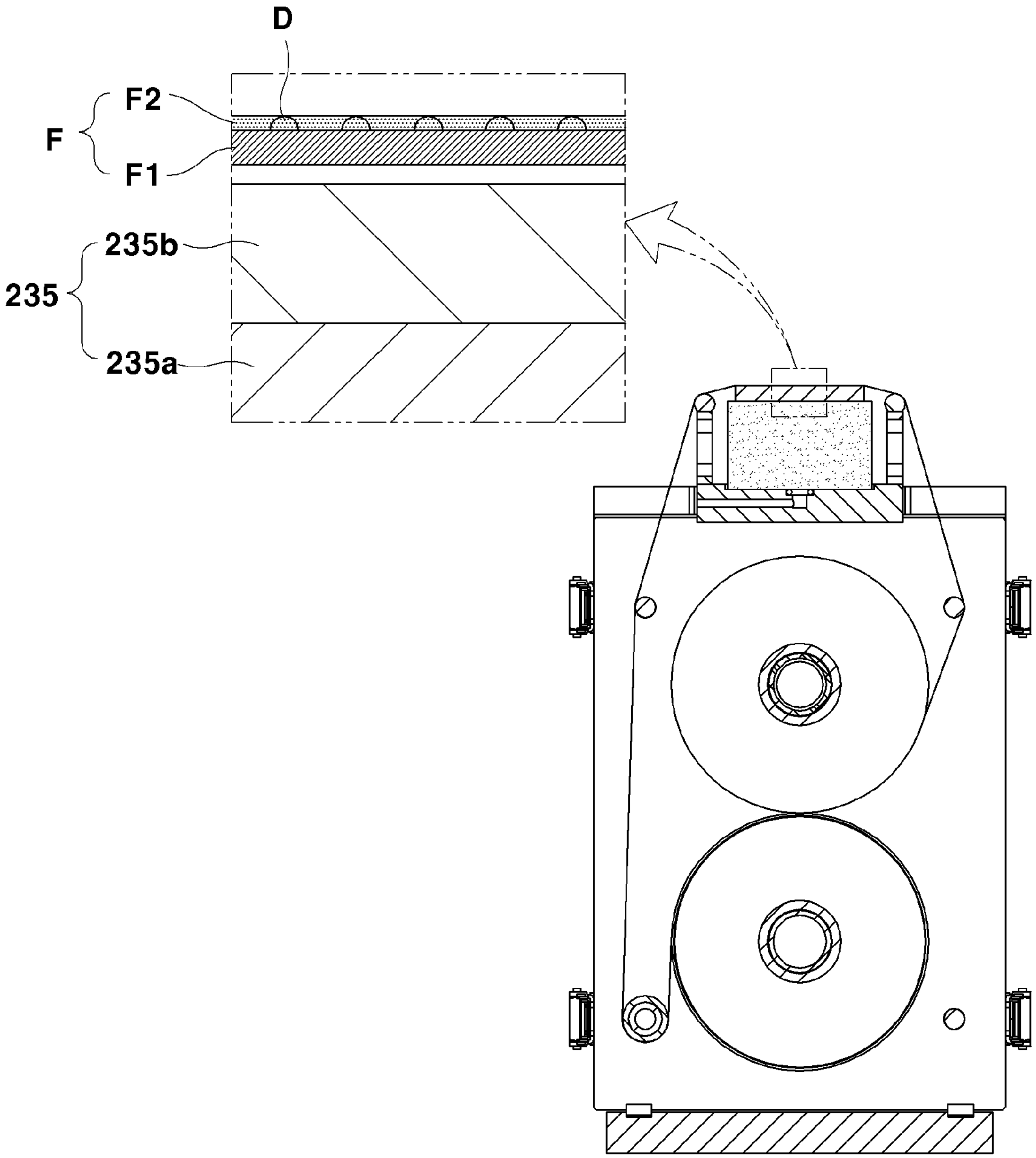
FIG. 8 is a cross-sectional view illustrating an inspection film disposed on the cartridge portion of the apparatus for inspecting the inkjet head nozzle according to an embodiment of the present invention.
Figure 9:
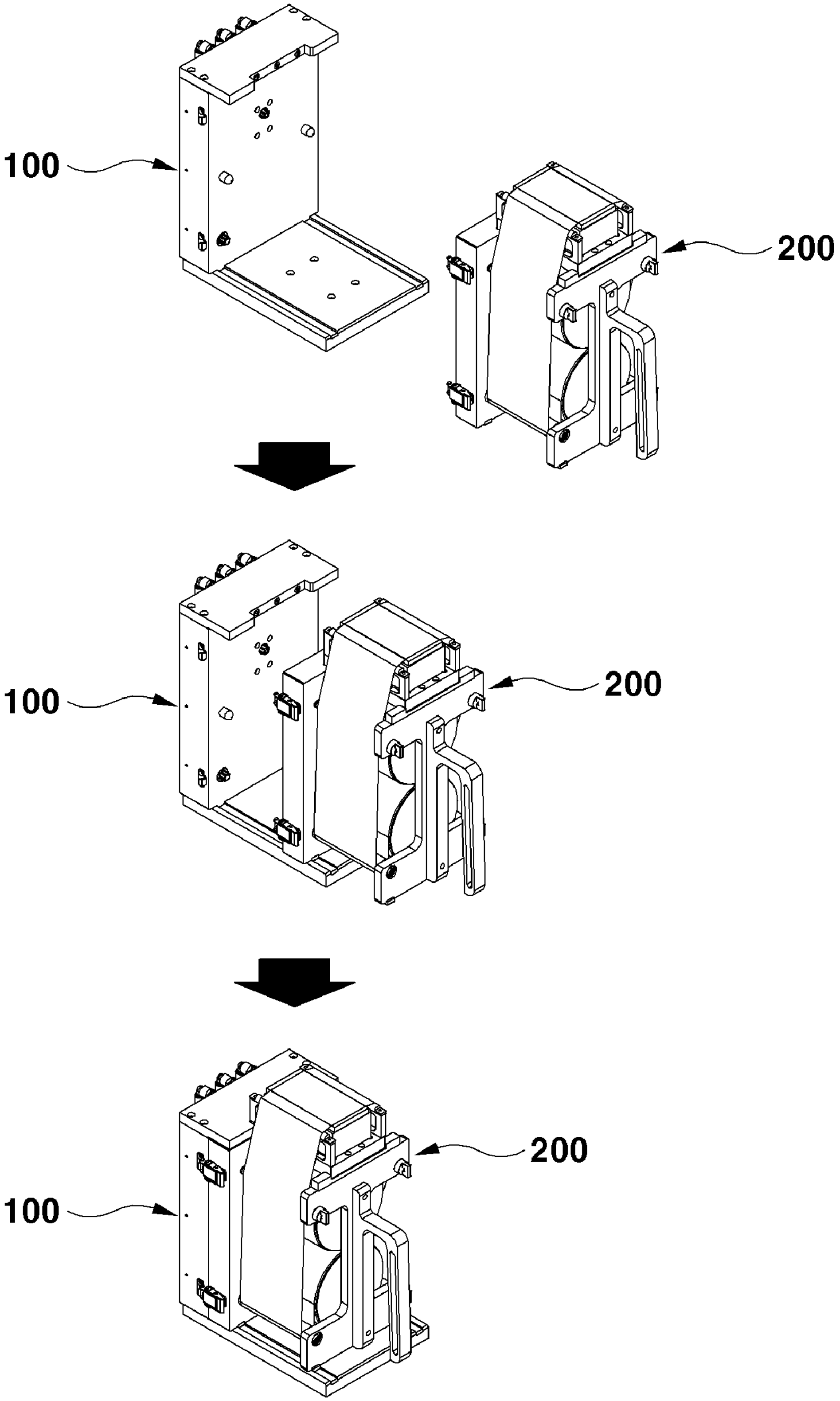
FIG. 9 is a view illustrating a process of fastening the cartridge portion to the cartridge fastening portion of the apparatus for inspecting the inkjet head nozzle according to an embodiment of the present invention.

As illustrated in FIG. 8, a porous ink droplet seated layer F2 is disposed on a surface of the inspection film wound around the inspection film supply roll. Specifically, the ink droplet seated layer F2 may be formed by applying anodic aluminium oxide (AAO) layer or a nanoparticle layer onto a surface of a PET film F1, and through this, an error in which a position of an ink droplet D dropped onto the surface of the inspection film F is changed due to vibration or device transfer.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for supplying an inspection film for inspecting an ejection state of ink droplets sprayed from a head nozzle of inkjet equipment provided in a glove box, the apparatus comprising:

a cartridge fastening portion comprising:

a fixing base configured to be installed on a maintenance area in the glove box for maintaining the head nozzle of the inkjet equipment;

a housing having a rectangular box shape and fixed to an upper portion of one side of the fixing base; and a supply manifold mounted to an upper portion of the housing; and a cartridge portion comprising:

a cover box which has a rectangular box shape having opened one side and in which a bottom surface is seated on a top surface of the fixing base, and an opened portion is seated on the housing to allow the cover box to be fastened to the cartridge fastening portion;

an outer plate fastened to the other side of the cover box by a plurality of connecting rods;

a connection manifold fastened to an upper portion of the cover box and an upper portion of the outer plate;

a testbed assembled to an upper portion of the connection manifold; and a unwinding roller to which a replaceable inspection film supply roll is mounted and a winding roller to which a replaceable inspection film recovery roll is mounted, which are parallel to each other between the cover box and the outer plate.

2. The apparatus of claim 1, wherein the supply manifold comprises:

at least one positive pressure supply hole connected to a positive pressure port configured to receive positive pressure; and at least one negative pressure supply hole connected to a negative pressure port configured to receive negative pressure, and the connection manifold comprises:

at least one positive pressure connection hole connected to the positive pressure supply hole to receive the positive pressure of the positive pressure supply hole;

a positive pressure discharge hole that provides the positive pressure of the positive pressure connection hole to the testbed;

at least one negative pressure connection hole connected to the negative pressure supply hole to receive the negative pressure of the negative pressure supply hole; and a negative pressure discharge hole that provides the negative pressure of the negative pressure connection hole to the testbed.

3. The apparatus of claim 1, wherein the housing contains a rotation driving part and a driving gear rotating by rotational force of the rotation driving part and exposed to the outside of the housing, and the winding roller is exposed to the opened portion of the cover box and shaft-coupled with a driven gear engaged with the driving gear.

4. The apparatus of claim 1, wherein the cartridge portion comprises a driven friction roller provided between the cover box and the outer plate in parallel with the unwinding roller and shaft-coupled with a transmission gear exposed to the opened portion of the cover box, and the cartridge fastening portion comprises a measurement gear engaged with the transmission gear, a rotation disk that is shaft-coupled with the measurement gear, and a photo sensor configured to detect an amount of rotation of the rotation disk.

5. The apparatus of claim 1, wherein a guide rail is formed on a top surface of the fixing base, and a guider guided by the guide rail is disposed on a bottom surface of each of the outer plate and the cover box.

6. The apparatus of claim 1, wherein a guide projection configured to guide a mounting position of the cartridge portion to the cartridge fastening portion and a guide bushing to which the guide projection is inserted are disposed on facing surfaces of the housing and the cover box, respectively.

7. The apparatus of claim 1, wherein the unwinding roller is frictionally supported by a friction unit comprising a pulley shaft-coupled with the unwinding roller and exposed to the opened portion of the cover box, a friction wire wound around the pulley to generate predetermined friction force, and a fixing bracket configured to fix both ends of the friction wire.

8. The apparatus of claim 1, wherein the unwinding roller comprises a first unwinding roller rotatably supported on the cover box and a second unwinding roller rotatably supported on the outer plate, and the winding roller comprises a first winding roller rotatably supported on the cover box and a second winding roller rotatably supported on the outer plate.

9. The apparatus of claim 1, wherein the plurality of connecting rods are separable from the cover box and the outer plate, and the outer plate is separated from the cover box when the plurality of connecting rods are separated from the cover box and the outer plate.

10. The apparatus of claim 1, wherein an anti-rotation projection by which a portion of the inspection film roll is caught and which is inserted thereto to prevent relative rotation of the inspection film supply roll or the inspection film recovery roll is formed on each of the unwinding roller and the winding roller.

11. The apparatus of claim 1, wherein a circular flange configured to prevent the inspection film supply roll or the inspection film recovery roll from being separated is integrally formed on each of both ends of each of the unwinding roller and the winding roller.

12. The apparatus of claim 1, wherein a support bracket is disposed on each of both sides of the connection manifold, and a film support bar having a rounded upper portion is disposed on the support bracket to maintain a horizontal state of the inspection film.

13. The apparatus of claim 1, wherein fastening units that are coupled to each other to fix a mounting state of the cartridge portion to the cartridge fastening portion are disposed on the housing and the cover box, respectively.

14. The apparatus of claim 1, wherein a porous ink droplet seated layer is provided on a surface of the inspection film.

15. An apparatus for, supplying an inspection film for inspecting an ejection state of ink droplets sprayed from a head nozzle of inkjet equipment provided in a glove box, the apparatus comprising:

a cartridge fastening portion configured to be installed in a glove box having a built-in inkjet equipment; and a cartridge portion which comprises a testbed for inspection of an ejection state of ink droplets of a head nozzle of the inkjet equipment, to which an inspection film supply roll and an inspection film recovery roll, which are replaceable to supply an inspection film onto an upper portion of the testbed, are mounted, and which is attachable to/detachable from the cartridge fastening portion.

16. The apparatus of claim 15, wherein the cartridge fastening portion is installed on a maintenance area in the glove box configured to maintain the head nozzle of the inkjet equipment.

17. The apparatus of claim 15, wherein the cartridge fastening portion comprises:

at least one positive pressure supply hole connected to a positive pressure port configured to receive positive pressure; and at least one negative pressure supply hole connected to a negative pressure port configured to receive negative pressure, and wherein positive pressure of the positive pressure supply hole and negative pressure of the negative pressure supply hole are supplied to the cartridge portion.

18. The apparatus of claim 15, wherein the cartridge fastening portion comprises a rotation driving part and a driving gear that rotates by rotational force of the rotation driving part, and rotational force of the driving gear is supplied to the cartridge portion.

19. The apparatus of claim 15, wherein the cartridge fastening portion comprises:

a measurement gear configured to rotate by receiving rotational force of a driven friction roller disposed on the cartridge portion so as to rotate by friction with an inspection film unwound from the inspection film supply roll;

a rotation disk connected to the measurement gear to rotate; and a photo sensor configured to detect an amount of rotation of the rotation disk, wherein an unwound amount of the inspection film unwound from the inspection film supply roll is calculated based on an amount of rotation of the rotation disk detected by the photo sensor.

20. The apparatus of claim 15, wherein the cartridge fastening portion comprises at least one mounting guide configured to guide a mounting position of the cartridge portion.

21. The apparatus of claim 15, wherein the cartridge portion comprises:

at least one positive pressure connection hole configured to receive positive pressure from the cartridge fastening portion; and at least one negative pressure connection hole configured to receive negative pressure from the cartridge fastening portion, wherein the positive pressure supplied to the positive pressure connection hole from the cartridge fastening portion and the negative pressure supplied to the negative pressure connection hole from the cartridge fastening portion are supplied onto an upper portion of the testbed.

22. The apparatus of claim 15, wherein the cartridge portion comprises:

an unwinding roller to which the inspection film supply roll is mounted; and a winding roller to which an inspection film recovery roll configured to wind the inspection film of the inspection film supply roll mounted to the unwinding roller is mounted, wherein the winding roller rotates by receiving rotational force from the cartridge fastening portion, and the unwinding roller is frictionally supported by a friction unit.

23. The apparatus of claim 22, wherein the inspection film is transferred so that an inspection surface of the inspection film unwound from the inspection film supply roll mounted to the unwinding roller faces an opposite side of the testbed and then wound around the inspection film recovery roll mounted to the winding roller.

24. The apparatus of claim 15, wherein the cartridge portion comprises a driven friction roller configured to rotate by friction with the inspection film unwound from the inspection film supply roll, and rotational force of the driven friction roller is supplied to the cartridge fastening portion.

25. The apparatus of claim 15, wherein the cartridge fastening portion comprises:

at least one positive pressure supply hole connected to a positive pressure port configured to receive positive pressure; and at least one negative pressure supply hole connected to a negative pressure port configured to receive negative pressure, and the cartridge portion comprises:

at least one positive pressure connection hole connected to the positive pressure supply hole to receive the positive pressure of the positive pressure supply hole; and at least one negative pressure connection hole connected to the negative pressure supply hole to receive the negative pressure of the negative pressure supply hole, wherein the positive pressure supplied to the at least one positive pressure connection hole and the negative pressure supplied to the at least one negative pressure connection hole are supplied onto an upper portion of the testbed to allow the inspection film to float.

26. The apparatus of claim 15, wherein the cartridge fastening portion comprises a rotation driving part and a driving gear configured to rotate by rotational force of the rotation driving part, and the cartridge portion comprises:

an unwinding roller to which the inspection film supply roll is mounted; and a winding roller to which the inspection film recovery roll configured to wind the inspection film of the inspection film supply roll mounted to the unwinding roller is mounted, wherein the unwinding roller is frictionally supported by a friction unit, and the winding roller is shaft-coupled with a driven gear, and rotational force of the driving gear is transmitted to the driven gear to allow the unwinding roller to rotate.

27. The apparatus of claim 15, wherein the cartridge portion comprises a driven friction roller configured to rotate by friction with the inspection film unwound from the inspection film supply roll, and a transmission gear is shaft-coupled with the driven friction roller, and the cartridge fastening portion comprises a measurement gear configured to rotate by receiving rotational force of the transmission gear, a rotation disk connected with the measurement gear to rotate, and a photo sensor configured to detect an amount of rotation of the rotation disk, wherein an unwound amount of the inspection film unwound from the inspection film supply roll is calculated based on an amount of rotation of the rotation disk detected by the photo sensor.

* * * * *